Jan. 30, 1973   H. WIERICK   3,713,951
WELDING APPARATUS FOR PLASTIC FOILS
Filed Dec. 7, 1970   4 Sheets-Sheet 1

INVENTOR
Horst Wierick
BY
Beaman & Beaman
attys

Jan. 30, 1973  H. WIERICK  3,713,951
WELDING APPARATUS FOR PLASTIC FOILS
Filed Dec. 7, 1970  4 Sheets-Sheet 2
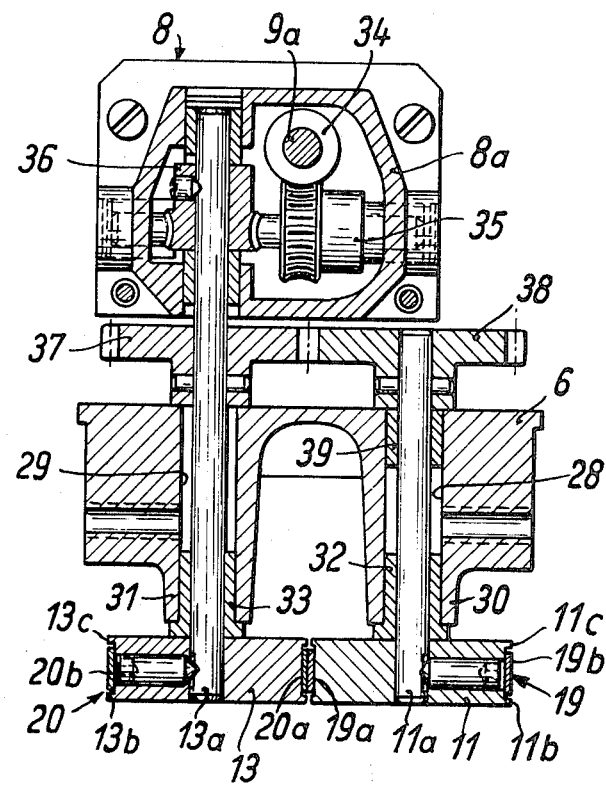
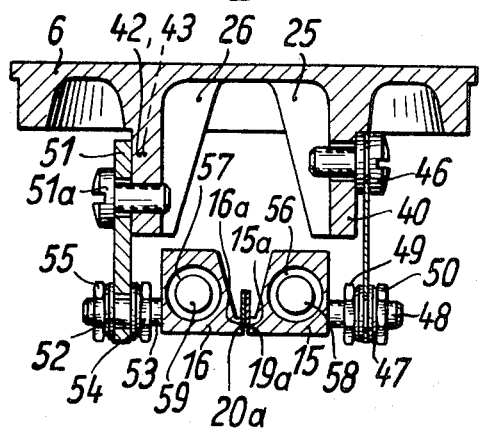
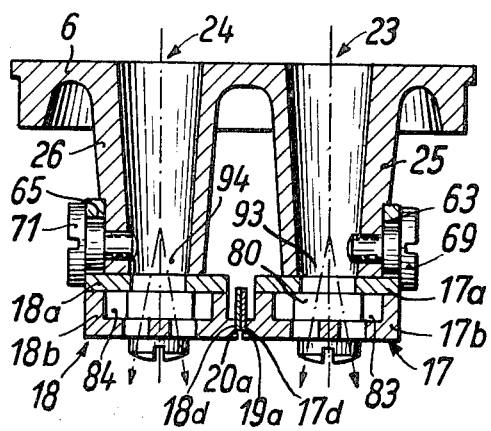
INVENTOR
Horst Wierick
BY
Beaman & Beaman
attys Jan. 30, 1973  H. WIERICK  3,713,951
WELDING APPARATUS FOR PLASTIC FOILS
Filed Dec. 7, 1970  4 Sheets-Sheet 3

INVENTOR
Horst Wierick
BY
Seaman & Seaman
Attys

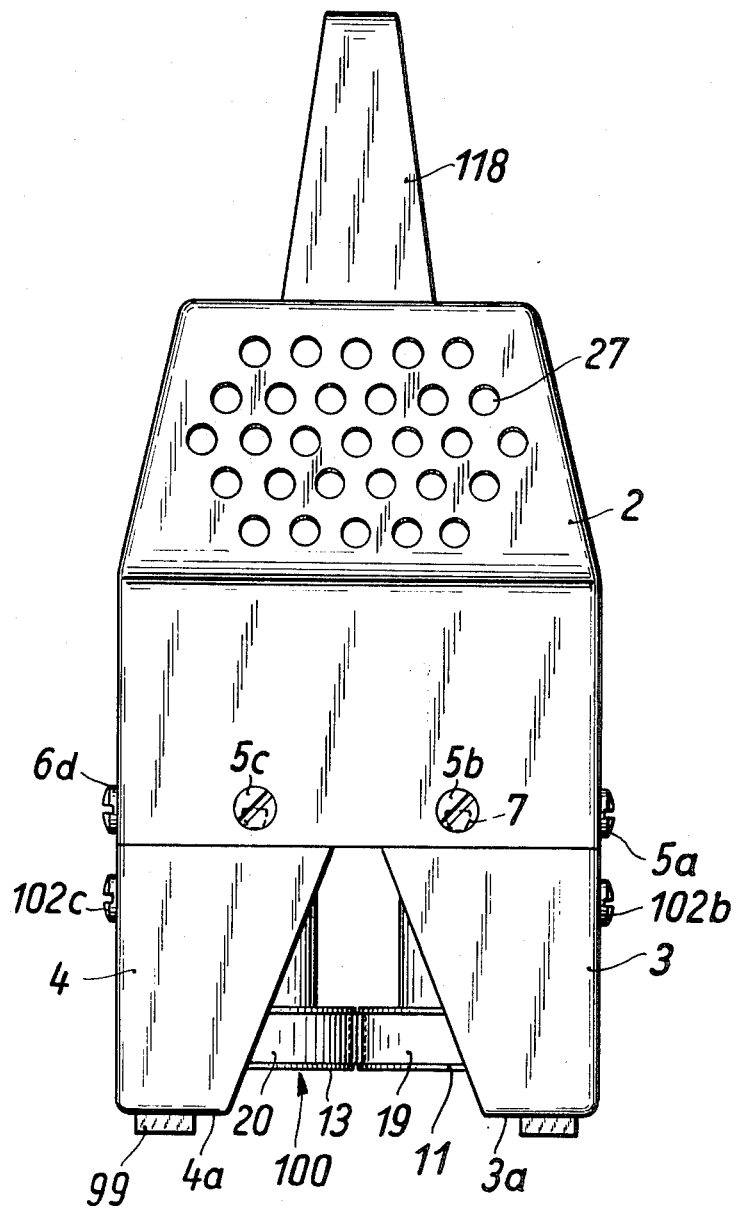

United States Patent Office 3,713,951
Patented Jan. 30, 1973

3,713,951
WELDING APPARATUS FOR PLASTIC FOILS
Horst Wierick, Ahrensburg, Germany, assignor to BeA-Verpackungsmaschinen Casties Wierick & Co. KG, Ahrensburg, Germany
Filed Dec. 7, 1970, Ser. No. 95,818
Claims priority, application Germany, Dec. 8, 1969, P 19 61 425.6
Int. Cl. B32b 31/08
U.S. Cl. 156—498
29 Claims

ABSTRACT OF THE DISCLOSURE

The welding apparatus consists of a motor, a fan mounted on the motor shaft, two pairs of rollers with two circulating endless heat-conductive tapes and heating and cooling blocks at the tapes. The foils are gripped between the tapes and led through the heating and cooling blocks whereby the foils are continuously welded. The fan sucks cooling air around the motor and blows it through the cooling blocks. With this construction the heat dissipation from the motor is improved and the life of the apparatus is lengthened especially by use of polytetrafluoroethylene coated glass fiber tapes instead of conventional steel tapes.

BACKGROUND OF THE INVENTION

The invention relates to a welding apparatus for plastic bags comprising two endless tapes of thermally conductive material disposed in parallel side-by-side and guided each around a pair of rollers, with one roller of each pair of rollers being adapted to be driven by means of a motor and the adjacent portions of the tapes moving between two heating blocks and two cooling blocks cooled by a fan. In particular, the invention is directed to a manually operated welding apparatus. It is possible with such apparatus to close bags or sacks, for example, consisting of weldable plastics material, by introducing them between the running tapes. When passing the heating jaws which are urged towards each other, heat is transferred from the jaws onto the plastic foils to be welded via the endless tapes, so that they are heated to welding temperature and are welded together. Thereupon the welded bag is guided between the cooling blocks so that the welded seam is cooled as quickly as possible under pressure whereby a strong and tight welding seam is formed.

An apparatus without housing is available on the market with a motor fastened on the end portion of a carrier member in such a manner that its shaft is positioned vertically with respect to the two tapes. The vane wheel of the cooling fan is driven by one end of the motor shaft while the other shaft end drives the two rollers supported in the end portion via a gearing, the intake opening being averted from the motor in order to ensure a possibly unobstructed intake cross-sectional area.

The fan is connected with a waste air channel which introduces the drawn air into the cooling blocks. The air flows through the cooling blocks and exits from the cooling blocks at their ends averted from the heating blocks in the direction of movement of the tapes, so that the likewise heated adjacent regions of the welded seam are not cooled by the air stream.

With such an arrangement of motor, air intake opening of the fan, and waste air channel, the motor is not positively cooled and the considerable heat of operation is poorly dissipated, so that only motors of small output or with a large surface can be used. At any rate, with continuous operation of the apparatus arranged in a line-production system, the motor may be overheated and thus will have to be stopped. Even with intermittent operation the known apparatus cannot be expected to have a long life. In addition, the known arrangement adds to the width of the apparatus.

The life and mode of operation of the known welding apparatus is impaired also in that the endless tapes are formed of metal such as steel, for example. The smooth running property of such tapes is poor because of their welding and the poor deformability of the tapes. The point of the welded connection presses itself into the welding seam of the plastics foils. The friction between the steel tapes and the metallic heating and cooling blocks is relatively high. The thermal expansion of the metallic tapes has an adverse influence because it may assume values which cannot be entirely balanced by tape tensioning devices.

The known tensioning device consists of two eccentric bolts for the non-driven rollers with lever arms at one end which are biased in different directions of rotation by springs engaging at the lever arms, in order to tighten the tapes and to press the rollers against each other. The radius of the eccentric bolts cannot always balance the thermal expansion to such an extent that the tapes are under sufficient tension for operation.

Furthermore, the mode of operation of the apparatus available on the market is impaired in that the heating block temperatures are controlled by means of one or several bimetallic thermostats which are rather sluggish and do not exactly maintain the desired temperature. At least when welding thin foils, it is necessary to keep the temperature rather constant. Without the housing, the operator is not sufficiently protected from the heated and the rotating structural members.

It is the object of the invention to overcome the above-mentioned disadvantages which render the handling of such an apparatus difficult and which endanger the operator and/or reduce the life of the apparatus. Another object of the invention is to provide an apparatus with improved dissipation of heat from the motor, the heating blocks and the cooling blocks, so that optimal conditions of operation are obtained.

SUMMARY OF THE INVENTION

In accordance with the invention, the fan adapted to blow cooling air through channels in the cooling blocks and the driving motor adapted to drive the endless tapes are drivingly interconnected and are arranged in a series in an apparatus housing, and intake openings are provided near the motor end averted from the fan for the entry of cooling air into the housing, in order to pass the air drawn in around the motor.

With this arrangement, thus, in accordance with the invention, the alleged disadvantage is put up that the intake cross sectional area of the cooling fan is partially obstructed by the motor and a gearing preferably flanged thereto. This, however, also brings about a very important advantage, namely the motor is positively cooled by the air taken in by the fan so that a motor of high or medium output and small surface may be installed.

It is recommendable to arrange the structural group comprising the motor, fan and gearing in such a manner that the shaft of the motor extends in parallel with the adjacently running tape sections, thus avoiding increase in the width of the apparatus measured vertically of the tape sections.

Furthermore, the vane wheel of the fan is fastened on the one end of the motor shaft, with the intake opening of the fan provided on the side of the fan averted from the motor, and a gear of said gearing is mounted on the other end of the shaft for rotating the driving rollers.

The housing suitably comprises an upper compartment with insulated handle and two shields laterally arranged in the region of the endless tapes, with all three of them being detachably fastened at a plate. Preferably, the upper part of the housing engages over the lateral shields with common fastening screws provided.

Motor, gearing and fan are mounted on the one side of the carrier plate, while the other side carries the roller pairs and the heating and cooling blocks, the plate being interrupted in two places and cooling air channel extensions formed at these places on the other side of the plate for discharging the cooling air into the cooling blocks from the fan.

To avoid the above-mentioned drawbacks of the endless metal tapes provision has been made in accordance with the invention for endless tapes consisting of plastic-coated glass fiber tapes; it is recommendable to use polytetrafluorethylene as a plastic coating material. Such tapes do not have an irregular connection point like steel tapes and are easily deformable so that they may be laid around the rollers without difficulties. The friction of a Teflon-coated tape on the metal surfaces of the heating and cooling blocks is extremely small. In addition, the Teflon-coated glass fiber tapes are characterized by low thermal expansion values.

In order to balance the low thermal expansion of these tapes, the wear caused by operation and the transverse stresses occurring during the passage of the edges of plastic bags, the invention provides a very simple tensioning means which is easy to arrange. For this purpose, the idle rollers of the roller pairs are each supported individually on one of the cooling blocks. The cooling blocks are fastened to the plate in parallel with the adjacent tape strips and in a manner to be displaceable independently of each other. It is recommendable for the movable cooling blocks to be forced by resilient means in such a manner that the tapes are stretched between the pair of driven rollers and the pair of idle rollers on the cooling blocks. The force of the resilient means is preferably variable by means of adjusting devices.

With such an arrangement, elongations are immediately balanced so that the tapes are always stretched; however, they may yield under transversely directed forces.

So that the tapes may be safely guided on the idle rollers even under high loads, they are mounted at the cooling blocks preferably by means of an oblique eccentric bolt. It is assured by rotation of the bolts that the tape always takes its proper position on the roller. In most of the cases, however, it will suffice to provide the roller of the individual roller pairs with guiding edges.

The cooling blocks are provided each with an air entry opening on their upper sides disposed vertically with respect to the plane of the tapes and on the undersides with several outlet openings so that part of the cooling air is discharged in a direction vertical with respect to the direction of onward movement of the tapes. By this the regions adjacent the welded seams of the sacks or bags which have likewise been heated on their passage through the heating blocks are cooled.

In order to ensure the movability of the cooling blocks in parallel with the tape strips being in contact with each other, the cooling blocks according to the invention may consist of two cooling block members. Preferably, the first cooling block member is provided with elongated holes extending in the direction of said tape strips with screw bolts threaded into the plate gripping through said elongated holes. The screw bolts are provided with a cylindrical threadlesss portion so that the first cooling block member is movable to and fro in parallel with said tape strips through a distance corresponding to the length of the elongated holes. The second cooling block member is connected with the first one by screws. Preferably, one of the second cooling block members is provided with at least two elongated holes extending vertically with respect to the planes of said tape strips having the screw bolts threaded into the first cooling block member engaging therethrough.

In a suitable embodiment of the invention, a spring is provided in the second cooling block member provided with the elongated holes, said spring being clamped between a flange of the second member which extends in parallel with the plane of the tape strips, and an abutment, said spring pressing the second cooling block member of the said cooling block against the tapes and towards the other cooling block.

Both second cooling block members are provided with an opening adapted to allow screwing of the fastening bolts of the first cooling block member. To facilitate the run-in of the foils to be welded between the cooling blocks, the second cooling block members are beveled at the inlet end of the individual cooling block.

The width of the welded seam is defined by flange-like portions at the heating and cooling blocks.

In order to reduce the noises caused by the operation of the apparatus, the two gears arranged on the drive shafts of the driven rollers and being directly in mesh with each other, are made of a wear-resistant synthetic material. The one shaft extends in a known manner into the gear box of the gearing.

As in accordance with the invention the control of the temperature is not effected by means of a simple bi-metallic thermostat but electronically, the welding apparatus having a plate equipped with electronic elements and fuses. In order to combine the operating elements in a circuit panel, one switch board is suitably arranged detachably in an opening of the housing. In an advantageous embodiment, there are on and off switches provided on the switch board as well as a resistor step switch, two signal lamps and a supply cable. The motor is switched on by means of the off switch; with the resistor step switch it is possible to connect various voltages to the heating elements of the heating blocks, so that the temperature thereof is adjustable. The one signal lamp shows that the motor is running and the other signal lamp shows that the heating blocks are being heated.

The welding apparatus according to the invention is further characterized by two terminal blocks on the plate with electronic elements and conductor sections for connecting the terminal blocks with the electric members of the switch board, the motor and the heating elements in the heating blocks.

In case the apparatus is to be employed in a production line it would not be reasonable for an operator to hold the apparatus permanently in his hands. Therefore, blind screws are provided for the apparatus to be fitted in a rack. In this rack a conveyor-line may run which passes the bags to be welded through the welding apparatus.

By the welding apparatus according to the invention the drawbacks mentioned which make working with the known apparatus difficult and endanger the operator and/or reduce the life of the apparatus, are avoided. Owing to the guidance of the cooling air sucked in for the cooling blocks a motor of high output may be selected as a drive means. The construction of the cooling blocks allows the tape to be stretched under all temperature conditions and with any wear and transverse stresses, and to be in contact with the large areas of the bags. The desired fine control of the temperature of the heating blocks is obtained by electronic temperature control.

BRIEF DESCRIPTION OF THE DRAWING

The invention will now be described in the following by way of a drawing. In the figures of the drawing, FIG. 2 shows a transverse cross sectional view of the welding apparatus taken on line A–B of FIG. 1, FIG. 3 shows a transverse cross sectional view of the apparatus of FIG. 2 taken on line C–D, FIG. 4 shows a transverse cross sectional view taken on line E–F of FIG. 1, FIG. 7 shows a side plan view taken on the inlet end of the apparatus.

DESCRIPTION OF THE PREFERRED EMBODIMENT

Figure 1:
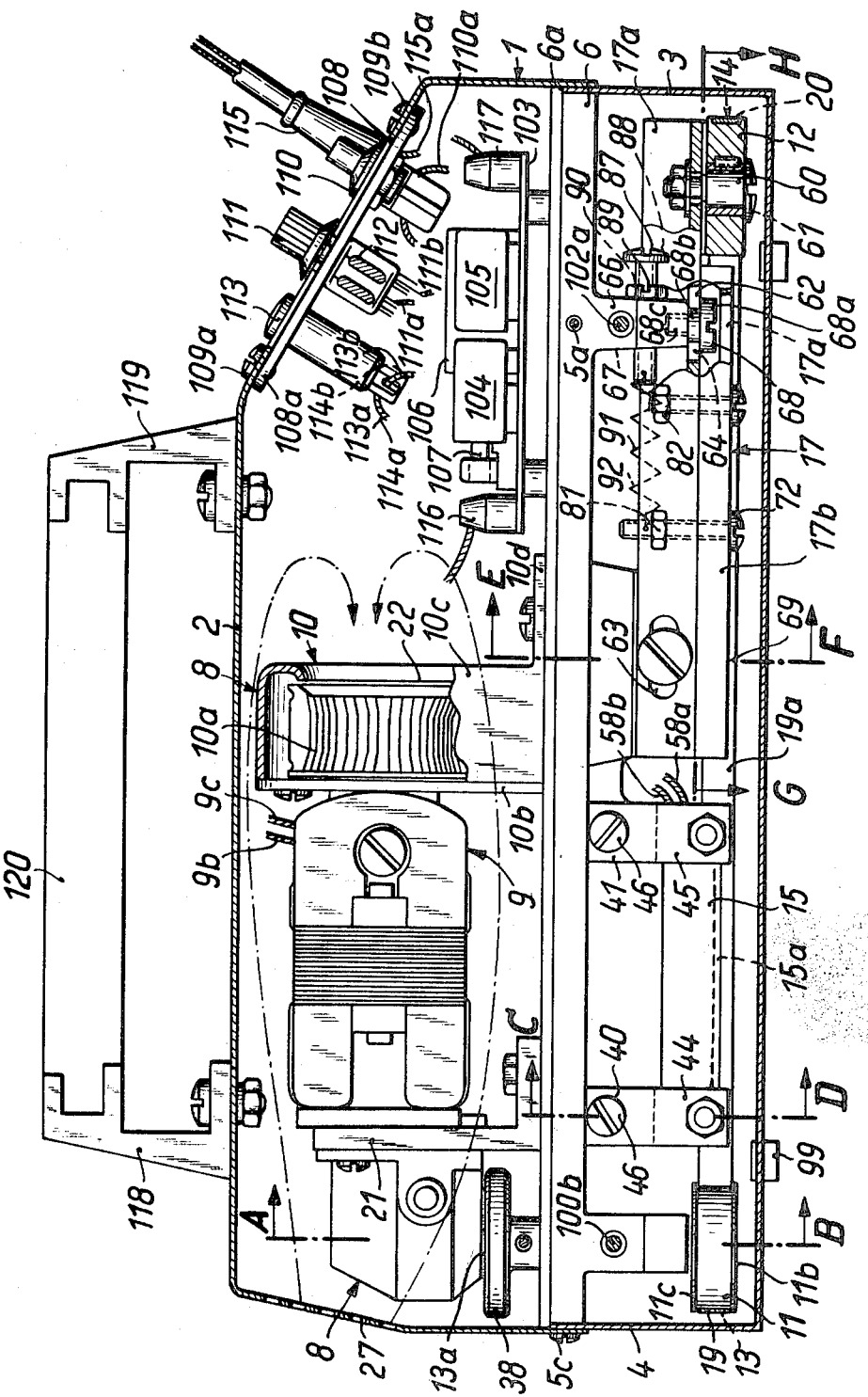
FIG. 1 shows a longitudinal sectional view of a welding apparatus in accordance with the invention.
Figure 5:
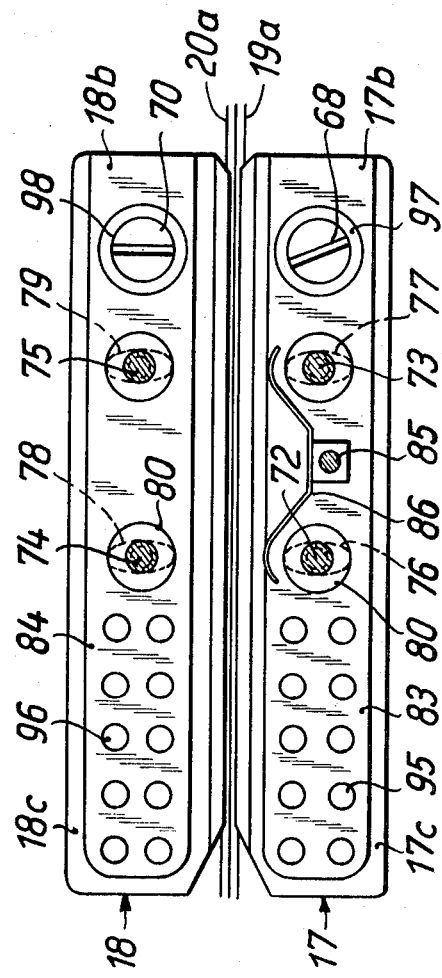
FIG. 5 shows a sectional view taken on line G-H of FIG. 1.
Figure 6:
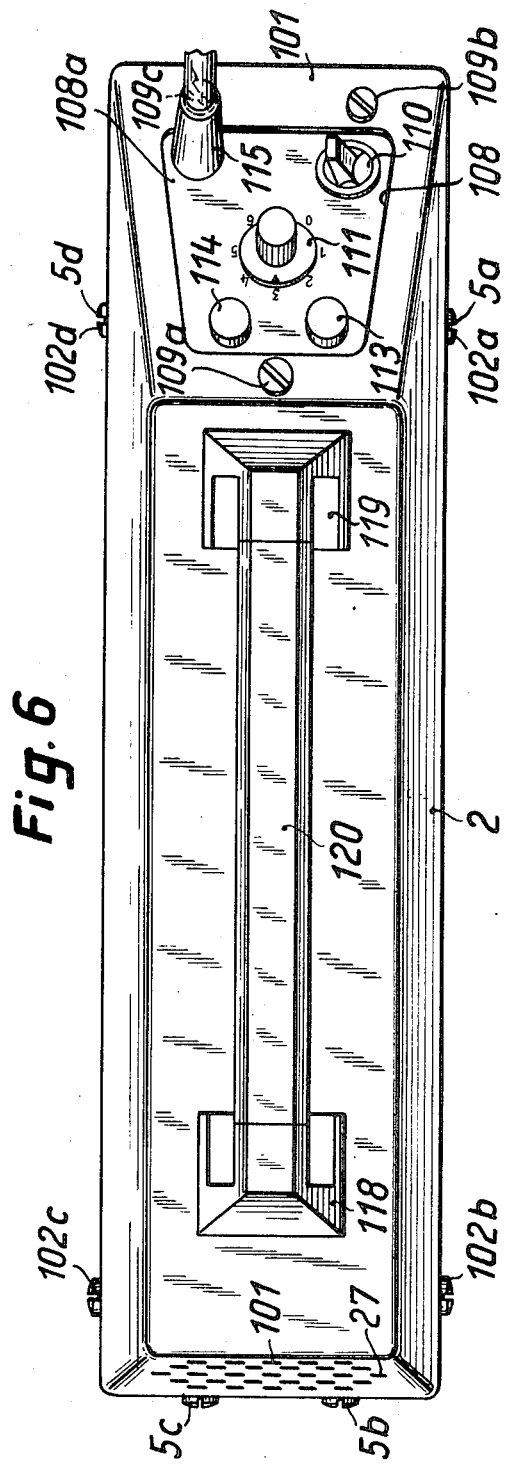
FIG. 6 shows a top plan view taken on the apparatus in accordance with the invention.

The housing 1 consists of an upper member 2 and two lateral shutters 3 and 4. The upper part and the lateral shutters 3 and 4 are fastened to a carrier plate 6 by means of screws 5a, 5b, 5c and 5d. Plate 6 is provided with a small flange 6a on the upper surface thereof so that the lateral shutters 3 and 4, respectively, may be pushed between the side surface of the carrier plate 6 and the inner surface of the upper portion 2 when the upper portion grips over the carrier plate. In this manner, the screws 5a and 5d may simultaneously serve to fasten the lateral shutters and the upper portion at the carrier plate 6.

In order to be able to loosen from the carrier plate the lateral shutter 3 after having loosened the screws 5a and 5b and the lateral shutter 4 after having loosened the screws 5c and 5d without having to unscrew the screws completely from the carrier plate, the lateral shutters 3 and 4 are provided with marginal cutouts 7 as indicated in FIG. 7 so that they may be removed without these being any necessity of having to unscrew the screws 5.

A transmission 8, a motor 9 and a cooling fan 10 are arranged in a series on the carrier plate in the upper part of the housing. On the underside there are supported two roller pairs 11 and 12 or 13 and 14, respectively, two heating blocks 15 and 16, and two cooling blocks 17 and 18. The plane of rotation of the rollers extends in parallel with the plane of the essentially rectangular carrier plate, with the rollers 11 and 13 arranged near the one narrow edge driven by the electromotor 9 while the rollers 12 and 14 are supported in an overhung manner. An endless tape 19 is of heat conductive material is guided around the rollers 11 and 12, and a like band 20 is passed around the rollers 13 and 14. The simpler adjacent tapes 19a and 20a extending in parallel arrangement side by side extend between the heating blocks 15 and 16 and the cooling blocks 17 and 18. The tape sections 19b and 20b which are spaced from each other extend in parallel with respect to the first tape sections 19 and 20a in the neighborhood of the inner surface of the lateral shutters 3 and 4.

Transmission 8 and motor 9 are fastened at the carrier plate 6 by means of an angle iron in such a manner that the shaft 9a of the motor extends in parallel with respect to the tape portions 19a and 20a. The transmission 8 is arranged above the bearing region of the rollers 11 and 13 in such a manner that on the one hand the drive shaft 13a of the roller 13 engages within the transmission box 8a of the transmission 8 and on the other hand the motor shaft 9a extends into the transmission box 8a vertically with respect to the drive shaft 13a.

The vaned wheel 10a of the cooling fan is fastened on shaft 9a projecting from the end of the motor 9 averted from the transmission.

The housing 10 consists of a plate 10b adjacent the motor and having no intake opening, and an annular structural member 10c defining the intake opening 22 on the end of the cooling fan 10 averted from the motor, with a fastening flange 10d formed integrally with the said annular member 10c.

As the cooling fan 10 is a radial fan and serves to blow cooling air through recesses formed in the cooling blocks which are still to be defined, the carrier plate 6 is provided with passage openings 23 and 24 and cooling air stub ducts 25 and 26 which pass the cooling air to the cooling blocks 17 and 18. The further guidance of the cooling air into the cooling blocks will still be dealt with in detail hereinafter.

In the housing top portion 2 there are provided entry openings 27 for the entry of cooling air near the end of the motor facing away from the fan. The drawn-in cooling air flows approximately in the direction of the dash-dotted lines shown in FIG. 1 and thus over the surface of the transmission box 8 and the surface of the motor 9 before it reaches the intake opening 22 of the cooling fan. This results into an extremely effective positive cooling of the motor 9 which thus with a compact design may be of high output.

As will be seen from FIG. 2, lead-ins 28 and 29 are provided to pass the shafts 11a and 13a of the rollers 11 and 13, respectively, through the carrier plate 6, which lead-ins extend also through the guiding extensions 30 and 31. Bearing bushes 32 and 33 are fitted in the guiding extensions 30 and 31.

The shaft 13a is directly driven by the motor 9 via the transmission 8. A worm gear 34 arranged on the shaft 9a is in mesh with a worm gear structural member 35 the axis of which extends vertically with respect to the shaft 9a and in parallel with the narrow edges of the carrier plate. The structural member 35 is in mesh with a second worm gear structural member 36 arranged on the shaft 13a. A gear 37 is fastened on the shaft 13a between the gear box 8a and the carrier plate 6, said gear 37 being in mesh with a gear 38 of like diameter fastened on the shaft 11a. With this drive arrangement it is obtained that the tape sections 19a and 20a are moving in one and the same direction and at the same speed. In order to keep the noise at a low level, the gears 38 and 37 are made of a wear-resistant synthetic material. Another bearing bushing 39 is fitted near the upper surface of the carrier plate 36 to support the shaft 11a; this is not necessary in the case of the shaft 13a, because the latter is still supported once more in the transmission box 8a.

The rollers 11 and 13, the gears 37 and 38 and the worm gear structural elements 35 and 36 are fastened on the associated shafts by means of threaded bolts.

In accordance with FIGS. 1 and 3, the carrier plate is provided with fastening extensions 40 and 41 to fasten the heating block 15, and 42 and 43 to fasten the heating block 16. The heating block 15 is fastened at the carrier plate 6 by means of leaf springs 44 and 45 with the upper end of the leaf springs being retained by bolts 46 engaging within the fastening extension while a threaded bolt 48 formed at the heating block 15 engages at the other end of the leaf springs through an opening 47. The space at which the leaf spring is fastened from the heating block 15 may be varied by means of two nuts 49 and 50 on both sides of the leaf spring. According to FIG. 3, the heating blocks 16 are fastened in the same manner by means of a strip iron 51, through screw bolts 51a, threaded studs extending through bores 52, and nuts 54 and 55.

This manner of fastening makes possible an exact adjustment of the position of the heating blocks 15 and 16 with respect to the center plane disposed vertically with respect to the plane of the carrier plate, thus simultaneously varying the contact pressure by means of which the springs 44 and 45 press the heating block 15 against the tape section 19a and thus in the direction towards the heating block.

As will be seen from FIG. 3, cylindrical electrical resistance heating elements 58 and 59 are fitted in the cylindrical recesses 56 and 57 in the heating blocks 15 and 16, respectively. The electrical energy supply will be dealt with hereinafter.

The cooling blocks 17 and 18 include two separate building elements 17a and 17b or 18a and 18b, respectively.

The idle rollers 12 and 14 are supported at the structural components 17b and 18b at the ends averted from the heating blocks 15 and 16 by means of adjustable oblique eccenter bolts 60 and 61. It is possible with the aid of a certain oblique position of the oblique eccenter bolts 61 and 60 to stabilize to rotation of the tapes 19 and 20. With normal conditions of operation, however, marginal flanges 11b and 11c or 13b and 13c, respectively, such as designed at the driven rollers 11 and 13 will do.

In order to obtain an irreproachable operation, the tapes must be tensioned. In the embodiment shown in FIG. 1 this is obtained by fastening the first structural members 17b and 18b of the cooling blocks in parallel with respect to the adjacent tape sections 19a and 19b and in a manner to be independently displaceable from each other at the carrier plate 6. For this purpose, the structural members 17b and 18b are provided with elongated holes 62 and 63 or 64 and 65, respectively. The structural components 17a and 18b are designed in the shape of angles and the elongated holes 62 and 64 are designed on the angular leg which extends in parallel with the plane of the carrier plate 6 while the elongated holes 63 and 65 are formed on the angular leg which extends vertically with respect to the carrier plate 6. Fastening extensions 66 and 67 are formed within the region of the elongated holes 62 and 64. A bolt 68 consisting of a screw head 68a, a threadless cylindrical portion 68b and a threaded portion of smaller diameter 68c engages through the elongated hole 62. When the threaded stud 68 is screwed-in, the threadless portion 68 abuts against the surface of the fastening extension 66, so that the structural component 17b is movable back and forth in the direction of the elongated hole, but is simultaneously prevented from performing a movement vertically with respect to the plane of the carrier plate by means of the bolt 68. A screw bolt 69 of similar design as the bolt 68 extends through the elongated hole 63; thus the structural member 17 is guided at two points.

The structural member 18b is connected with the carrier plate by means of similar bolts 70 and 71.

The structural members 17a and 17b are connected with each other through threaded bolts 72 and 73 and the structural members 18a and 18b are connected with each other through threaded bolts 74 and 75, with the axial length of the threaded bolts 72 and 74 being greater than that of the threaded bolts 73 and 75. The bolts 72 and 73 engage through elongated holes 76 and 77, respectively, and the bolts 74 and 75 extend through elongated holes 78 and 79, respectively. Spacer rings 80 are placed over the bolts 72, 73, 74 and 75. The bolts 72 and 73 extend through threadless bores in the structural member 17b and are threadedly engaged in the threaded bores in the structural member 17a and locked by means of counter nuts 81 and 82. The bolts 72 and 73 are screwed into the structural members 17a only to such an extent that the structural member 17a may move by means of the elongated holes 76 and 77 the axis of which extends vertically with respect to the web portions 19a and 20a.

The structural members 17b and 18b are provided with a peripherally extending rim 17c and 18b, respectively, which is missing only on the narrow edge of the essentially rectangular structural members 17b and 18c facing away from the heating blocks. On this rim 17c and 18c, respectively, the first structural members 17a and 18e, respectively, are supported whereby a cavity 83 and 84, respectively, is defined between the members. In the first structural member 17a there is provided a threaded bore for a bolt 85 between the bores for the accommodation of the bolts 72 and 73, said bolt 85 projecting into the cavity 83. A leaf spring 86 is fastened at this bolt 85 in such a manner that it is supported on the inner surface of the rim 17c thus resiliently urging the structural member 17b in a direction towards the strip portions 19a and 20a and the structural member 18b, respectively. The spring is of symmetrical configuration and is provided with two roundings-off which with the structural member 17b moving contrary to the spring force encompass the spacer rings 80 pushed over the bolts 72 and 73 in close surrounding engagement. The bolts 74 and 85 are screwed into the threaded openings in the structural member 18a to such an extent that the heads of the bolts 74 and 75 come to lie on the outer surface of the structural members 17b. The structural members 18a and 18b are therefore not movable with respect to each other.

Threaded bolts 87 and 88 are threaded into the fastening extensions 66 and 67 with a nut 89 and 90, respectively, screwed-on between the fastening lug surface and the heads of the bolts, so that the length of the threaded portion extending from the guiding portion is on the opposite side is adjustable in various degrees. The axes of the screws 87 and 88 extend in parallel with the surface of the carrier plate 6. Springs 91 and 92 are hooked-in between the screw bolts 72 and 74 and the ends of the bolts 87 and 88, said springs tending to pull the cooling blocks 17 and 18 away from the heating blocks. These springs 91 and 92 tension the webs 19 and 20.

Cooling air is blown into the cavities 83 and 84, respectively, through the cooling channel extensions 25 and 26 and through the elongated holes 93 and 94 formed in the region of the cooling air guides in the legs of the first structural members 17a and 18a extending in parallel with the surface of the carrier plate 6. The cooling air leaves the cavity through openings 95 and 96 which are formed near the inlet end of the cooling blocks 17 and 19 in such a manner that the cooling air exiting from the cavities likewise cools the material welded by the sealing apparatus near the welded seam. The remainder of the cooling air exits at the edgeless ends of the cooling blocks in the direction of the onward movement.

Furthermore, circular openings 97 and 98 are provided in the structural members 17b and 18b which enable actuation of the bolts 68 and 70.

The tapes 19 and 20 revolving around the roller pairs 11 and 12 and 13 and 14, respectively, are endless Teflon-coated glass fiber reinforced tapes, having no welded seam, causing low friction between the heating and cooling blocks and which are chemically very resistant.

The lateral diaphragms 3 and 4 protect the working regions of the revolving tapes and therefore are each provided with a flange portion 3a and 4a extending in parallel with the surface of the carrier plate, said flange portions serving simultaneously as a base surface to stand on. Rubber stoppers 99 are fastened to these flanges which make it possible for the apparatus to be placed on a table safe against slipping. Furthermore, the lateral diaphragms 3 and 4 are designed on the narrow ends of the carrier plate 6 in such a manner that essentially a triangular inlet opening and an equally shaped outlet opening 100 and 101 are formed, which do not prevent the entry of the sacks or bags.

So that the apparatus may be fastened in a rack when fitted in a production chain, blind screws 102a, 102b, 102c and 102d are provided which simultaneously serve the purpose of additionally fastening the lateral diaphragms 3 and 4 at the carrier plate 6.

A switchboard 102 equipped with electronic switching elements and fuses is arranged in the cavity between the housing upper portion 2 and the carrier plate 6 and is fastened with the carrier plate 6. FIG. 1 shows capacitors 104 and 105 fastened on the switchboard 103, a cast-in temperature control element 106 and a partial view of a fuse 107.

An opening 108 is cut in a bevelled part of the upper member 2 with a switchboard 108a fastened therein by means of screws 109a, 109b and 109c, said switchboard having arranged thereon an on/off switch 110 a resistor step switch 111 with resistors 112, two signal lamps 113 and 114 and a feed cable 115 for the supply of electric energy.

Terminal strips 116 and 117 are fastened on the switchboard 103 on two edges spaced from each other. The supply lines 58a and 58b and 59a, 59b, respectively, of the heating elements 58 and 59, the motor feeding lines 9b and 9c are guided to the terminal strip 116. Supply lines 58a and 58b and 59a, 59b, respectively, of the heating elements 58 and 59 and the motor feeding lines 9b and 9c are guided to the terminal strip 116. The feeding lines 114a and 114b of the signal/lamp 114; the lines 11a and 111b of the stepped switch 111; the discharge lines 110a and a pole 115a of the supply line 115 are guided to the terminal ledge 117. The lines 113a and 113b switch the signal lamp 113 between the one pole 115a of the supply line and the conductor section 110a from the switch, with the signal lamp 113 indicating the on/off condition of the apparatus and the signal lamp 114 indicating the heating condition of the heating elements 58 and 59.

The regulation of the temperature through an electronic circuit is essentially more exact than a regulation through a bimetallic strip.

The apparatus is provided with an insulating handle by means of two clamping angle members 118 and 119 threadedly connected with the upper portion 102 and a structural member 120 of insulating material. When operating the apparatus, the bag to be packaged is introduced into the apparatus through the opening 100. Here it is seized between the rollers 11 and 13 by the tapes 19 and 20 which are moved at a revolving speed of approximately 9 m./min. The foil material is heated to a welding temperature between the heating blocks 15 and 16, and welded. The width of the welded seam depends on the width of the flanges 15a and 16a formed at the heating blocks. Then the tapes guide the bags immediately between the two cooling blocks which are urged together by the spring 86. Here the welded seam is cooled under pressure. The structural members 17b and 18b are provided with flange-like extensions 17b and 18b corresponding in width to that of the heating flanges 15a and 16a. During the passage of the bag between the heating blocks 17 and 18 the bag is cooled by the partial flow exiting vertically with respect to the direction of movement through the openings 95 and 96. The other portions of the cooling air exits at the ends of the cooling blocks. As the regulation of the temperature of the heating blocks is effected electronically, also very thin heating foils of about 25 microns may be welded without the welding temperature being exceeded owing to a wrongly adjusted temperature. Such an apparatus no longer suffers from the disadvantages listed in the introduction to this specification.

What I claim is:

1. Welding apparatus for thermoplastic plastic foil, comprising, in combination, a housing, a plate mounted in said housing separating said housing into a first compartment having a wall and a second compartment provided with a longitudinal opening, a motor within said housing first compartment having a motor shaft, a fan mounted upon said shaft having an inlet and an outlet, a first and a second pair of rollers mounted in said second compartment with one roller of each pair located adjacent both ends of said longitudinal opening, both rollers at one end of said opening being drivingly connected to said motor, a first and a second endless tape formed of heat conductive material stretched around said first and said second pair of rollers, respectively, the tape portions facing opposed to each other being adapted to engage thermoplastic foil therebetween, a pair of heating blocks and a pair of cooling blocks mounted on said housing arranged in series along the opposed tape portions between the rollers adapted to heat and cool the tape portions running therethrough, respectively, intake openings for cooling air defined in the wall of said first compartment, said motor being located intermediate said openings and said fan inlet to permit the intake air to flow over the motor to the inlet of the fan, and conduit means connecting said fan outlet with said cooling blocks.

2. A welding apparatus according to claim 1, wherein the shaft of the motor extends parallel with said opposed tap portions.

3. A welding apparatus according to claim 1, wherein said fan includes a vane wheel mounted on one end of said motor shaft and said fan inlet faces away from the motor and the other end of the motor shaft and is coupled with said driven rollers by means of a gearing.

4. A welding apparatus according to claim 1, wherein said motor and said fan are mounted on one side of said plate and the rollers and the heating and cooling blocks are mounted on the other side of said plate and said conduit means directing the air to said cooling blocks comprise two openings in the plate connected in said first compartment to said delivery side of the fan outlet and in the second compartment by passages to said cooling blocks whereby the air flows from said fan to said cooling blocks.

5. A welding apparatus according to claim 1 wherein said heating and cooling blocks each comprise two metal blocks arranged on both sides of the opposed tape portions and are adapted to be heated and cooled, respectively.

6. A welding apparatus according to claim 1, wherein the endless tapes comprise plastic-coated glass fiber tapes.

7. A welding apparatus according to claim 6, wherein the coating plastic is polytetrafluorethylene.

8. A welding apparatus according to claim 1, wherein both rollers near the other end of said longitudinal opening are each rotatably supported on a cooling block.

9. A welding apparatus according to claim 8, wherein said both rollers are supported on said cooling blocks by means of oblique eccentric screw bolts.

10. A welding apparatus according to claim 1, wherein at least one roller of each pair of rollers are formed with guiding edges.

11. A welding apparatus according to claim 1, wherein said cooling blocks mounted on said plate are adapted to be displaced independently of each other parallel with said tape portions.

12. A welding apparatus according to claim 11, wherein said cooling blocks are forced into the running direction of the tapes by resilient means whereby the tapes between the driven rollers and the rollers arranged on the cooling blocks are stretched.

13. A welding apparatus according to claim 12, wherein the tensional force of the resilient means is variable.

14. A welding apparatus according to claim 1, wherein said cooling blocks are provided on their upper side disposed vertically with respect to the plane of said tapes with an air intake opening and on their underside with several air discharge openings adapted to discharge a part of the cooling air vertically to the opposed tape portions.

15. A welding apparatus according to claim 1, wherein each cooling block consists substantially of a first and a second cooling block member enclosing a cavity.

16. A welding apparatus according to claim 15, wherein the first cooling block member has formed therein a slotted hole extending in parallel to the opposed tape portion and is mounted at said plate by means of screw bolts extending through said hole and provided with a threadless section.

17. A welding apparatus according to claim 15, wherein the second cooling block member is connected with the first cooling block member by screws.

18. A welding apparatus according to claim 17, wherein one of the second cooling block members is provided with at least two slotted holes extending vertically to the tape plane with the screws passing therethrough.

19. A welding apparatus according to claim 15, wherein with at least one cooling block a spring is inserted between a flanged rim formed on the second cooling block member in parallel with the plane of said tapes and an abutment member connected with the first cooling block member, said spring forcing the second cooling block member against the opposed tape portions and the other cooling block.

20. A welding apparatus according to claim 15, wherein the second cooling block member is bevelled at the entrance end towards the slit whereby the run-in of the tapes is facilitated.

21. A welding apparatus according to claim 1, wherein said heating and cooling blocks are formed with flange-like projections contacting the opposed tape portions and defining the width of the resultant welding seam.

22. A welding apparatus according to claim 3, wherein said gears mounted on the shafts of the driven rollers and meshing with each other consist of a wear-resistant plastic material.

23. A welding apparatus according to claim 1, wherein a plate with electronic elements and fuses is mounted in said first compartment.

24. A welding apparatus according to claim 23, wherein a switchboard with indicating and switching elements is mounted in an opening arranged in said housing.

25. A welding apparatus according to claim 24, wherein two terminal blocks are provided on the plate with said electronic elements adapted to be connected with said elements on said switchboard, the motor and heating elements being arranged in said heating blocks.

26. A welding apparatus according to claim 1, wherein said heating blocks are pressed against each other by resilient means.

27. A welding apparatus according to claim 26, wherein the force of the resilient means is variable.

28. A welding apparatus according to claim 1, wherein the position of the heating blocks is adjustable with respect to the center plane of said housing.

29. A welding apparatus according to claim 1, wherein dummy screws are provided on said housing for installation of the apparatus in a support.

References Cited

UNITED STATES PATENTS

| | | | |
|---|---|---|---|
| 2,658,552 | 3/1952 | Grevich | 156—498 X |
| 2,697,473 | 12/1954 | Techtmann | 156—498 |
| 3,140,971 | 7/1964 | Crescenzo et al. | 156—498 |
| 3,397,633 | 8/1968 | Harris | 156—583 X |

EDWARD G. WHITBY, Primary Examiner

U.S. Cl. X.R.

100—93 RP; 156—583